(12) United States Patent
Benson et al.

(10) Patent No.: US 9,197,114 B2
(45) Date of Patent: Nov. 24, 2015

(54) BRUSHLESS ALTERNATOR

(71) Applicant: All-Tek Maintenance Ltd., Lloydminster (CA)

(72) Inventors: Dale E. Benson, Lloydminster (CA); Ronald J. Heidel, Lloydminster (CA)

(73) Assignee: All-Tek Maintenance Ltd., Lloydminster (CA)

( * ) Notice: Subject to any disclaimer, the term of this patent is extended or adjusted under 35 U.S.C. 154(b) by 271 days.

(21) Appl. No.: 13/791,525

(22) Filed: Mar. 8, 2013

(65) Prior Publication Data

US 2013/0320787 A1 Dec. 5, 2013

(51) Int. Cl.
*H02K 9/04* (2006.01)
*H02K 9/06* (2006.01)
*H02K 11/04* (2006.01)

(52) U.S. Cl.
CPC .. *H02K 9/04* (2013.01); *H02K 9/06* (2013.01); *H02K 11/046* (2013.01)

(58) Field of Classification Search
CPC .......... H02K 9/04; H02K 11/046; H02K 9/06
USPC ........................................... 310/59, 58, 60 A
See application file for complete search history.

(56) References Cited

U.S. PATENT DOCUMENTS

| 4,221,982 | A | * | 9/1980 | Raver et al. ..................... 310/59 |
| 4,739,204 | A | * | 4/1988 | Kitamura et al. ........... 310/68 D |
| 4,955,944 | A | * | 9/1990 | Aso et al. ................... 123/41.31 |
| 4,980,588 | A | * | 12/1990 | Ogawa ........................ 310/68 D |
| 7,633,194 | B2 | * | 12/2009 | Dawsey et al. .................. 310/57 |
| 7,759,838 | B2 | * | 7/2010 | Bradfield et al. ............. 310/263 |
| 2006/0170298 | A1 | * | 8/2006 | Edrington ..................... 310/90 |
| 2007/0210662 | A1 | * | 9/2007 | Bradfield ........................ 310/90 |
| 2013/0015732 | A1 | * | 1/2013 | Bradfield ........................ 310/59 |

* cited by examiner

*Primary Examiner* — Alex W Mok
(74) *Attorney, Agent, or Firm* — Christensen O'Connor Johnson Kindness PLLC

(57) ABSTRACT

A brushless alternator has a housing with a front portion and a rear portion. A stator assembly, rotor assembly, and coil support are positioned within the housing. The coil support has a shank portion of a first outer diameter and a base portion of a second outer diameter greater than first outer diameter. The base portion includes a plurality of air flow openings that extend through a second sidewall. A rectifier and regulator assembly is positioned on the outside of the rear portion of the housing. A front fan circulates air across the stator assembly at the front portion of the housing. A rear fan creates a cooling flow of air through flow openings of the coil support to circulate air across the regulator and rectifier assembly and the stator assembly.

1 Claim, 2 Drawing Sheets

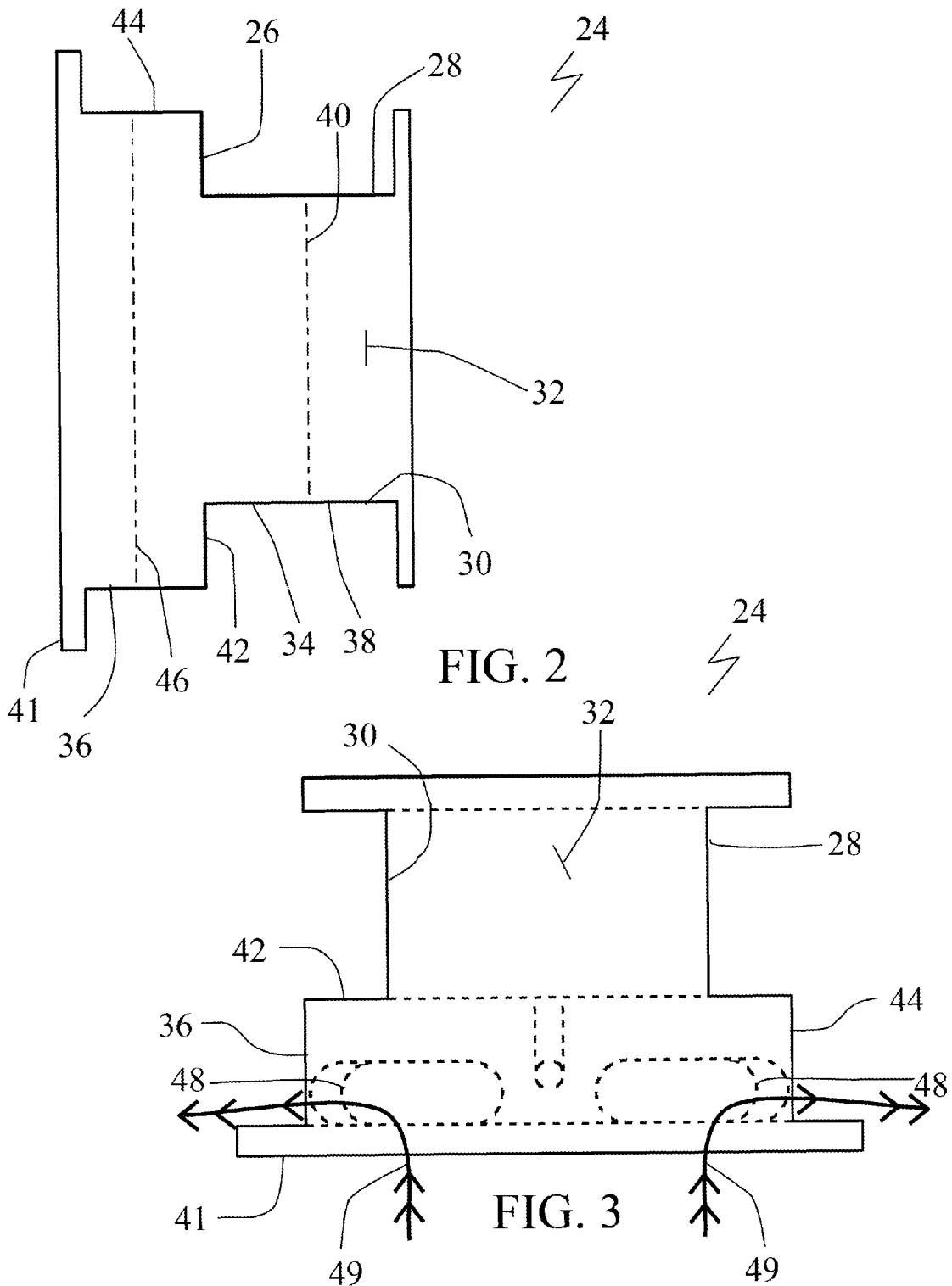

BRUSHLESS ALTERNATOR

FIELD

There is described a brushless alternator.

BACKGROUND

Brushless alternators have housings with a front portion and a rear portion. The electronic components, such as diode rectifiers and voltage regulators are positioned in the rear portion. The size and placement of these electronics components inhibit provision of adequate cooling air, which is circulated by a fan positioned in the front portion. U.S. Pat. No. 7,759,838 (Bradfield et al.), entitled "Coil Support For Rotating Electrical Machine," describes problems that are currently being experienced in providing adequate cooling to brushless alternators and proposes a solution. The solution proposed is to provide the base of the coil support with a plurality of recesses configured to increase a cooling flow into the electrical machine. There will hereinafter be described an alternative approach to further increase cooling.

SUMMARY

There is provided a brushless alternator that has a housing with a front portion and a rear portion. A stator assembly and a rotor assembly are positioned within the housing. A regulator and rectifier assembly is positioned on the outside of the rear portion of the housing. A coil support is position within the housing and has a tubular body with an exterior surface and an interior surface that defines an interior bore. The exterior surface has a shank portion and a base portion. The shank portion has a first sidewall of a first outer diameter configured to support a field coil. The base portion is disposed at one axial end of the shank portion and extends substantially axially in one direction therefrom. The base portion has a second sidewall of a second outer diameter greater than the first outer diameter. The base portion includes a plurality of air flow openings that extend from the exterior surface through the second sidewall and interior surface to provide a path for air flow from the exterior surface to the interior bore. A front fan is positioned in the front portion of the housing forward of the rotor assembly to circulate air across the stator assembly at the front portion of the housing. A rear fan is positioned in the rear portion of the housing forward of the regulator and rectifier assembly. The rear fan creates a cooling flow of air drawn from exterior of the housing, directing the cooling flow of air through flow openings in the base portion of the coil support to circulate air across the regulator and rectifier assembly and the stator assembly at the rear portion of the housing.

All other brushless alternators use a single fan, positioned on the outside of the front housing to pull air through the alternator (from back to front) to cool the electronics and stator assembly. However, by the time the circulating air reaches the stator windings it has already been heated and does not provided the needed cooling to the stator assembly. With the brushless alternator described above, there is both a front fan circulating air at the front portion of the housing and a rear fan circulating air at the rear portion of the housing. Air flow openings are provided in the base portion of the coil support to facilitate such air circulation.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 2 is a side elevation view of a coil support.

FIG. 3 is a top plan view, in section, of the coil support shown in FIG. 2.

DETAILED DESCRIPTION

Figure 1:
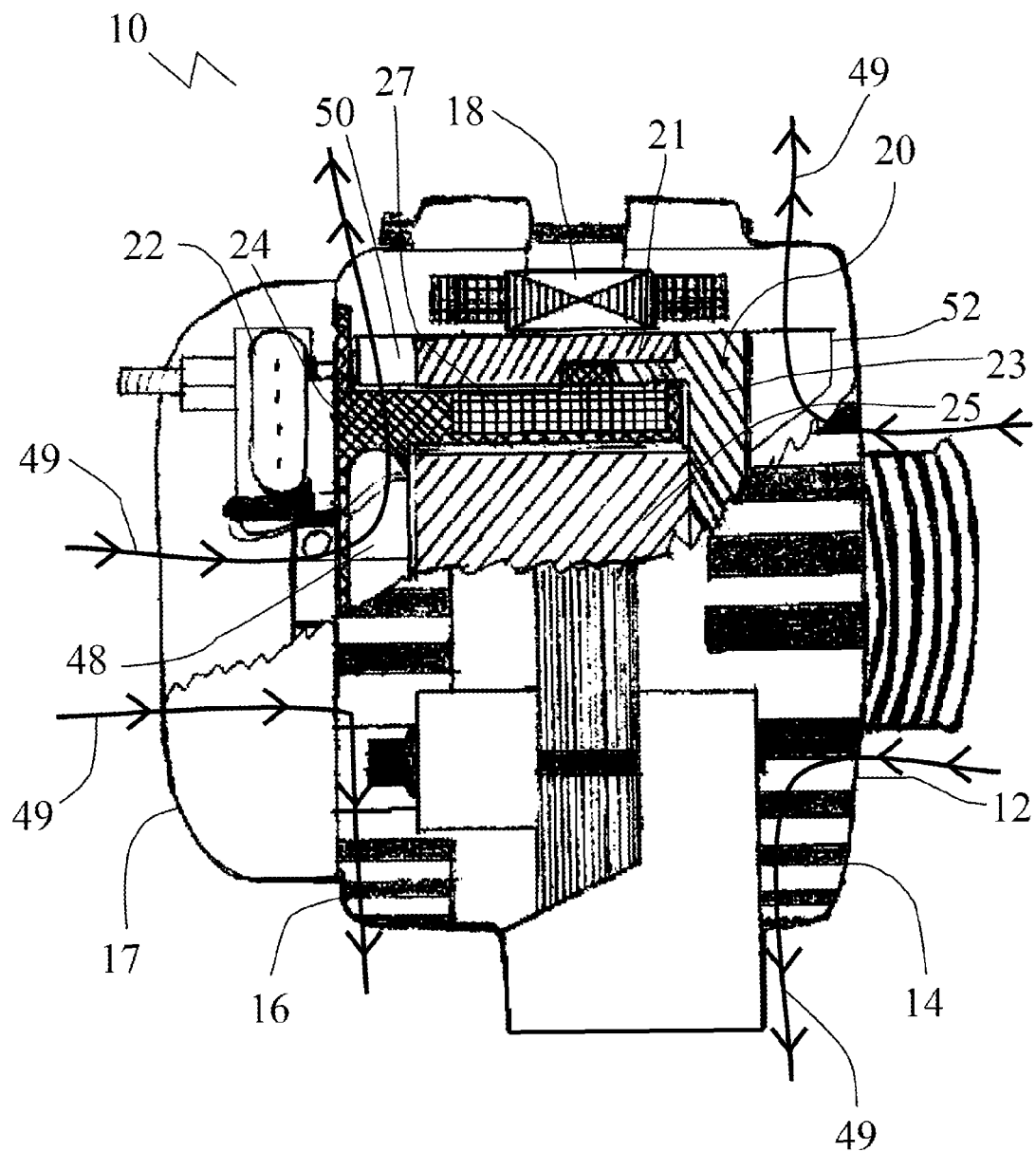
FIG. 1 is a side elevation view, partially in section, of a brushless alternator.

A brushless alternator generally identified by reference numeral 10, will now be described with reference to FIGS. 1 through 3.

Structure and Relationship of Parts:

Referring to FIG. 1, a brushless alternator 10 includes a housing 12 that has a front portion 14 and a rear portion 16. A stator assembly 18 and a rotor assembly 20 are positioned within housing 12. Rotor assembly 20 has a south pole 21, a north pole 23, and a rotor core 25. A regulator and rectifier assembly 22 are positioned on the outside of rear portion 16 of housing 12, covered with a plastic cover 17. Heat sink plates, not shown, on the back of regulator and rectifier assembly 22 and rear portion 16 of housing 12 transfers the heat from regulator and rectifier assembly 22 to housing 12. A coil support 24 is positioned within housing 12. Coil support 24 is wound with wire 27 to magnetize rotor assembly 20. Referring to FIG. 2, coil support 24 has a tubular body 26 with an exterior surface 28 and an interior surface 30 that defines an interior bore 32. Exterior surface 28 has a shank portion 34 and a base portion 36. Shank portion 34 has a first sidewall 38 of a first outer diameter 40 configured to support a field coil, not shown. Base portion 36 is disposed at one axial end 42 of shank portion 34 and extends substantially axially in one direction therefrom. Base portion 36 has a second sidewall 44 of a second outer diameter 46 greater than first outer diameter 40 and a base ring 41. Referring to FIG. 3, base portion 36 includes a plurality of air flow openings 48 that extend from exterior surface 28 through second sidewall 44 and interior surface 30 to provide a path for air flow from exterior surface 28 to interior bore 32. Referring to FIG. 1, a front fan 52 is positioned in front portion 14 of housing 12 forward of the rotor assembly 20 to circulate air 49 across stator assembly 18 at front portion 14 of housing 12. A rear fan 50 is positioned in rear portion 16 of housing 12 forward of regulator and rectifier assembly 22. Rear fan 50 creates a cooling flow of air drawn from exterior of housing 12. Cooling air 49 is drawn across regulator and rectifier assembly 22 as it enters rear portion 16 of housing 12. Referring to FIG. 3, the cooling flow of air 49 is directed through flow openings 48 of coil support 24 and along interior bore 32.

Operation:

Referring to FIG. 1, brushless alternator 10 allows cooling air to flow through coil support 24. Rear fan 50 and front fan 52 create a cooling flow of air drawn from exterior of housing 12 and, referring to FIG. 3, directs the air through flow openings 48 of coil support 24 and along interior bore 32. Referring to FIG. 1, front fan 52 circulates air across stator assembly 18 and rear fan 50 pulls cooling air across regulator and rectifier assembly 22.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A brushless alternator, comprising:
   a housing having a front portion and a rear portion;
   a stator assembly positioned within the housing;
   a rotor assembly positioned within the housing;
   a regulator and rectifier assembly positioned on the outside of the rear portion of the housing;
   a coil support positioned within the housing, the coil support being stationary relative to the stator assembly, the coil support comprising:
   a tubular body having an exterior surface and an interior surface that defines an interior bore that receives at least a portion of the rotor assembly in spaced relation to the interior surface;
   the exterior surface having a shank portion and a base portion;
   the shank portion having a first sidewall of a first outer diameter configured to support a field coil; and
   the base portion disposed at one axial end of the shank portion and extending substantially axially in one direction therefrom, the base portion having a second sidewall of a second outer diameter greater than the first outer diameter, the base portion including a plurality of air flow openings extending from the exterior surface through the second sidewall and interior surface to provide a path for air flow from the exterior surface to the interior bore, the interior surface being spaced from the rotor assembly;
   a front fan positioned in the front portion of the housing forward of the rotor assembly to circulate air across the stator assembly at the front portion of the housing; and
   a rear fan positioned in the rear portion of the housing forward of the regulator and rectifier assembly, the rear fan creating a cooling flow of air drawn from exterior of the housing and directing the cooling air through flow openings in the base portion of the coil support to circulate air across the regulator and rectifier assembly and the stator assembly at the rear portion of the housing.

* * * * *